(12) United States Patent
Pijpers

(10) Patent No.: US 10,347,925 B2
(45) Date of Patent: *Jul. 9, 2019

(54) THREE-CHAMBER ELECTROCHEMICAL BALANCING CELLS FOR SIMULTANEOUS MODIFICATION OF STATE OF CHARGE AND ACIDITY WITHIN A FLOW BATTERY

(71) Applicant: Lockheed Martin Energy, LLC, Bethesda, MD (US)

(72) Inventor: Joseph Johannes Henricus Pijpers, Cambridge, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 444 days.

This patent is subject to a terminal disclaimer.

(21) Appl. No.: 15/143,344

(22) Filed: Apr. 29, 2016

(65) Prior Publication Data

US 2017/0317363 A1    Nov. 2, 2017

(51) Int. Cl.
*H01M 8/04186* (2016.01)
*H01M 8/18* (2006.01)
(Continued)

(52) U.S. Cl.
CPC ..... *H01M 8/04186* (2013.01); *H01M 4/9041* (2013.01); *H01M 8/08* (2013.01);
(Continued)

(58) Field of Classification Search
CPC .......... H01M 8/18; H01M 8/20; Y02E 60/528
See application file for complete search history.

(56) References Cited

U.S. PATENT DOCUMENTS 4,159,366 A    6/1979    Thaller
4,539,086 A    9/1985    Fujita et al.
(Continued)

FOREIGN PATENT DOCUMENTS

JP    H 08-21415 B2    3/1996
JP    2000-502832 A    3/2000
(Continued)

OTHER PUBLICATIONS

Soloveichik, "Flow Batteries: Current Status and Trends," 2015, Chem. Rev., 115 (20), pp. 11533-11558.
(Continued)

*Primary Examiner* — James Lee
(74) *Attorney, Agent, or Firm* — BakerHostetler

(57) ABSTRACT

Parasitic reactions, such as evolution of hydrogen at the negative electrode, can occur under the operating conditions of flow batteries and other electrochemical systems. Such parasitic reactions can undesirably impact operating performance by altering the pH and/or state of charge of one or both electrolyte solutions in a flow battery. Electrochemical balancing cells can allow adjustment of electrolyte solutions to take place. Electrochemical balancing cells suitable for placement in fluid communication with both electrolyte solutions of a flow battery can include: a first chamber containing a first electrode, a second chamber containing a second electrode, a third chamber disposed between the first chamber and the second chamber, a cation-selective membrane forming a first interface between the first chamber and the third chamber, and a bipolar membrane, a cation-selective membrane, or a membrane electrode assembly forming a second interface between the second chamber and the third chamber.

16 Claims, 8 Drawing Sheets

(51) Int. Cl.
    *H01M 8/08* (2016.01)
    *H01M 8/1053* (2016.01)
    *H01M 8/1067* (2016.01)
    *H01M 4/90* (2006.01)
    *H01M 8/1018* (2016.01)

(52) U.S. Cl.
    CPC ....... *H01M 8/1053* (2013.01); *H01M 8/1067* (2013.01); *H01M 8/186* (2013.01); *H01M 8/188* (2013.01); *H01M 2008/1095* (2013.01); *H01M 2300/0005* (2013.01); *H01M 2300/0014* (2013.01); *Y02E 60/528* (2013.01)

(56) References Cited

U.S. PATENT DOCUMENTS

| | | | |
|---|---|---|---|
| 5,026,465 | A | 6/1991 | Katz et al. |
| 5,258,241 | A | 11/1993 | Ledjeff et al. |
| 5,766,787 | A | 6/1998 | Watanabe et al. |
| 6,156,451 | A | 12/2000 | Banerjee et al. |
| 6,497,973 | B1 | 12/2002 | Amendola |
| 6,509,119 | B1 | 1/2003 | Kobayashi et al. |
| 7,179,561 | B2 | 2/2007 | Niu et al. |
| 2005/0084739 | A1 | 4/2005 | Swider-Lyons et al. |
| 2011/0117411 | A1 | 5/2011 | Horne et al. |
| 2011/0244277 | A1 | 10/2011 | Gordon, II et al. |
| 2013/0084482 | A1 | 4/2013 | Chang et al. |
| 2013/0316199 | A1 | 11/2013 | Keshavarz et al. |
| 2014/0004402 | A1 | 1/2014 | Yan et al. |
| 2015/0017494 | A1 | 1/2015 | Amstutz et al. |
| 2015/0329384 | A1* | 11/2015 | Astle .................. C25B 9/08 |
| | | | 205/749 |
| 2016/0233531 | A1 | 8/2016 | Reece et al. |
| 2016/0248109 | A1 | 8/2016 | Esswein et al. |
| 2016/0308234 | A1 | 10/2016 | Reece et al. |
| 2016/0308235 | A1 | 10/2016 | Reece |

FOREIGN PATENT DOCUMENTS

| | | |
|---|---|---|
| JP | 2007-073428 A | 3/2007 |
| JP | 2010-539919 A | 12/2010 |
| WO | WO-97/24774 A1 | 7/1997 |
| WO | WO-02/15317 A1 | 2/2002 |
| WO | WO-2010/138942 A2 | 12/2010 |
| WO | WO-2013/090680 A2 | 6/2013 |
| WO | WO-2014/120876 A1 | 8/2014 |
| WO | WO-2014/142963 A1 | 9/2014 |
| WO | WO-2015/048074 A1 | 4/2015 |
| WO | WO-2015/173359 A1 | 11/2015 |
| WO | WO-2016/168360 A1 | 10/2016 |

OTHER PUBLICATIONS

Partial Supplementary European Search Report dated Feb. 9, 2017, which isued in European Application No. 14847451.3.

Extended European Search Report from European Application No. 14857001.3, dated Apr. 26, 2017.

International Search Report and Written Opinion from PCT/US2017/028191, dated Jul. 19, 2017, 12 pages.

International Search Report and Written Opinion from PCT/US2017/030451, dated Jul. 5, 2017, 13 pages.

Hosseiny et al., "A polyelectrolyte membrane-based vanadium air redox flow battery," Electrochemistry Communications, 2010, pp. 751-754, vol. 13.

Stassi et al., "Performance comparison of long and short-side chain perfluorosulfonic acid membranes for high temperature polymer electrolyte membrane fuel cell operation," J Power Sources, 2011, pp. 8925-8930, vol. 196.

Tseng et al., "A kinetic study of the platinum/carbon anode catalyst for vanadium redox flow battery," J Electrochemical Society, 2013, pp. A690-A696, vol. 160.

Whitehead et al., "Investigation of a method to hinder charge imbalance in the vanadium redox flow battery," J Power Sources, 2012, pp. 271-276, vol. 230.

* cited by examiner

THREE-CHAMBER ELECTROCHEMICAL BALANCING CELLS FOR SIMULTANEOUS MODIFICATION OF STATE OF CHARGE AND ACIDITY WITHIN A FLOW BATTERY

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to electrochemical balancing cells for flow batteries and methods for their use.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof will synonymously refer to a material that undergoes a change in oxidation state during operation of a flow battery or like electrochemical energy storage system (i.e., during charging or discharging).

Although flow batteries hold significant promise for large-scale energy storage applications, they have often been plagued sub-optimal energy storage performance (e.g., round trip energy efficiency) and limited cycle life, among other factors. Despite significant investigational efforts, no commercially viable flow battery technologies have yet been developed. Certain issues leading to poor energy storage performance, limited cycle life, and other performance-degrading factors are discussed hereinafter.

Balanced oxidation and reduction of the active materials within each half-cell of a flow battery are desirable electrochemical reactions, since these reactions contribute to the flow battery's proper operation during charging and discharging cycles. Such reactions may be referred to herein as "productive reactions." Undesirable parasitic reactions can also occur within one or both half-cells of flow batteries and related electrochemical systems. As used herein, the term "parasitic reaction" will refer to any side electrochemical reaction that takes place in conjunction with productive reactions.

Parasitic reactions can involve a component of an electrolyte solution that is not the active material. Electrochemical reactions of an active material that render the active material unable to undergo reversible oxidation and reduction can also be considered parasitic in nature. Parasitic reactions that commonly occur in aqueous electrolyte solutions are reduction of water into hydrogen at the negative electrode and/or oxidation of water into oxygen at the positive electrode. Furthermore, parasitic reactions in aqueous electrolyte solutions can change the electrolyte solution's pH, which can destabilize the active material in some instances. Hydrogen evolution in a negative electrolyte solution, for example, can raise the pH by consuming protons and forming hydroxide ions. In non-aqueous electrolyte solutions, the electrolyte solvent can be similarly oxidized or reduced in an undesired parasitic reaction process. Further, in both aqueous and non-aqueous electrolyte solutions, electrode materials and other cell components can also undergo parasitic reactions (e.g., carbon or metal corrosion, separator oxidation, or the like) in some cases.

Discharge arising from parasitic reactions can also decrease the operating efficiency and other performance parameters of flow batteries. In the case of a parasitic reaction that occurs preferentially in one half-cell over the other, an imbalance in state of charge can result between the negative and positive electrolyte solutions. The term "state of charge" (SOC) is a well understood electrochemical energy storage term that will refer herein to the relative amounts of reduced and oxidized species at an electrode within a given half-cell of an electrochemical system. Charge imbalance between the electrolyte solutions of a flow battery can lead to mass transport limitations at one of the electrodes, thereby lowering the round-trip operating efficiency. Since the charge imbalance can grow with each completed charge and discharge cycle, increasingly diminished performance of a flow battery can result due to parasitic reactions. Parasitic generation of hydrogen at a negative electrode can further result in undercharging of the negative electrolyte solution, which can produce a state of charge imbalance. In addition, parasitic evolution of hydrogen in a negative electrolyte solution can result in partial discharge of the negative electrolyte solution, thereby further altering the state of charge balance.

The pH changes accompanying parasitic reactions can oftentimes be difficult to address. Small changes in proton and hydroxide ion concentrations can produce dramatic swings in pH, which can be problematic for some active materials. Without adequate ways to address pH fluctuations, the working lifetimes of electrolyte solutions can be significantly compromised. Adjustment of pH through adding an extraneous acid or base to an electrolyte solution can be further undesirable and problematic due to the accompanying changes in ionic strength and concentration of the active material. Further, addition of an extraneous acid or base at a rate sufficient to maintain a desired pH window in an electrolyte solution can sometimes be difficult, since the rates of parasitic reactions can often be highly variable. Since the pH changes resulting from parasitic reactions within electrolyte solutions can be additive, buffers may provide only temporary protection against pH changes until the buffering capacity has been exceeded.

In addition, conventional approaches for rebalancing state of charge in flow batteries and other electrochemical systems do not address pH changes in the electrolyte solutions. Conversely, simple addition of an extraneous acid or base to an electrolyte solution, or other conventional pH balancing approaches, do not address issues associated with state of charge imbalance. At the very least, conventional approaches for addressing pH variance and state of charge imbalance are performed separately, which can increase one or more of cost of goods, the physical size of a flow battery system, downtime associated with a flow battery's maintenance, and/or other associated operating costs.

In view of the foregoing, alternative rebalancing strategies for flow batteries and related electrochemical systems would be highly desirable in the art. The present disclosure satisfies the foregoing needs and provides related advantages as well.

SUMMARY

In some embodiments, the present disclosure provides electrochemical balancing cells including: a first chamber containing a first electrode, a second chamber containing a second electrode, a third chamber disposed between the first chamber and the second chamber, a first cation-selective membrane forming a first interface between the first chamber and the third chamber, and a bipolar membrane, a second cation-selective membrane, or a membrane electrode assembly forming a second interface between the second chamber and the third chamber.

In some embodiments, the present disclosure provides flow battery systems containing a first half-cell containing a first electrolyte solution, and a second half-cell containing a second electrolyte solution. Both the first half-cell and the second half-cell are in fluid communication with an electrochemical balancing cell including: a first chamber containing a first electrode, a second chamber containing a second electrode, a third chamber disposed between the first chamber and the second chamber, a first cation-selective membrane forming a first interface between the first chamber and the third chamber, and a bipolar membrane, a second cation-selective membrane, or a membrane electrode assembly forming a second interface between the second chamber and the third chamber. The first half-cell is in fluid communication with the first chamber and the second half-cell is in fluid communication with the third chamber.

In other various embodiments, the present disclosure provides methods including: providing an electrochemical balancing cell containing a first chamber containing a first electrode, a second chamber containing a second electrode, a third chamber disposed between the first chamber and the second chamber, a first cation-selective membrane forming a first interface between the first chamber and the third chamber, and a membrane electrode assembly or a second cation-selective membrane forming a second interface between the second chamber and the third chamber; introducing a first electrolyte solution containing a first active material into the first chamber; introducing a second electrolyte solution containing a second active material into the third chamber; introducing water or an acidic aqueous solution into the second chamber; applying a potential across the electrochemical balancing cell so as to induce a current therein, such that the second electrode is a positive electrode and the first electrode is a negative electrode; and converting water into oxygen and protons in the second chamber and reducing the first active material in the first chamber under the potential. The protons migrate into the second electrolyte solution in the third chamber. The membrane electrode assembly contains a cation-selective membrane and an oxygen-formation catalyst. An oxygen-formation catalyst is disposed in the second chamber when a second cation-selective membrane forms the second interface.

In still other various embodiments, the present disclosure provides methods including: providing an electrochemical balancing cell containing a first chamber containing a first electrode, a second chamber containing a second electrode, a third chamber disposed between the first chamber and the second chamber, a cation-selective membrane forming a first interface between the first chamber and the third chamber, and a bipolar membrane forming a second interface between the second chamber and the third chamber; introducing a first electrolyte solution containing a first active material into the first chamber; introducing a second electrolyte solution containing a second active material into the third chamber; introducing an alkaline aqueous solution into the second chamber; applying a potential across the electrochemical balancing cell so as to induce a current therein, such that the second electrode is a positive electrode and the first electrode is a negative electrode; and converting hydroxide ions into oxygen and water in the second chamber and reducing the first active material in the first chamber under the potential, while converting water into protons and hydroxide ions at the bipolar membrane. The protons migrate into the second electrolyte solution in the third chamber and the hydroxide ions migrate into the second chamber. An oxygen-formation catalyst is present in the second chamber.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
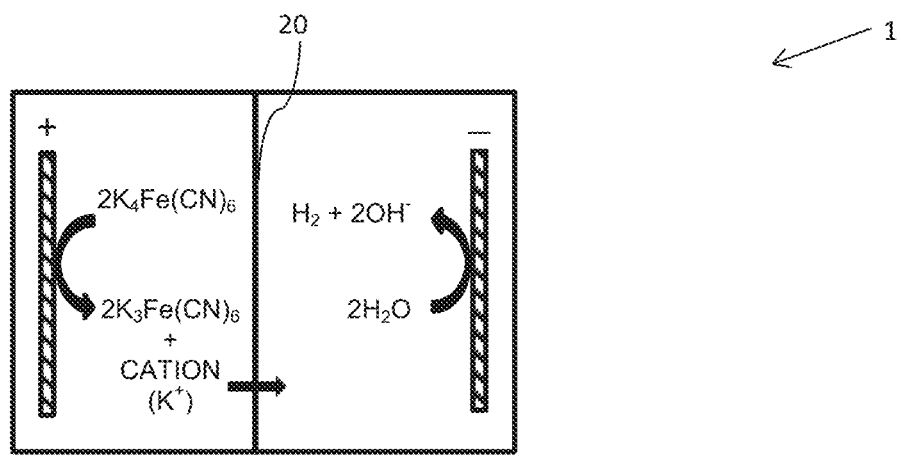
FIG. 1 shows a diagram demonstrating the reactions associated with parasitic generation of hydrogen in the negative half-cell of an illustrative flow battery.

The present disclosure is directed, in part, to electrochemical balancing cells that can simultaneously adjust pH and balance state of charge in electrolyte solutions. The present disclosure is also directed, in part, to flow batteries in fluid communication with an electrochemical balancing cell that can simultaneously adjust pH and balance state of charge in electrolyte solutions. The present disclosure is also directed, in part, to methods for simultaneously adjusting pH and balancing state of charge in electrolyte solutions using an electrochemical balancing cell.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. Parasitic reactions are one factor that can compromise the operating efficiency of flow batteries. Types of parasitic reactions that can occur in flow batteries include, for example, generation of hydrogen and oxidation by oxygen. Hydrogen generation in the negative electrolyte solution of flow batteries can be especially problematic due to pH changes and the state of charge imbalance accompanying this parasitic reaction.

The parasitic reaction of hydrogen evolution in the negative half-cell of a flow battery can occur as shown below in Reaction 1 below.

$$2H_2O + 2e^- \rightarrow H_2 + 2OH^-$$ (Reaction 1)

During ideal charging conditions, all current passed through the flow battery charges the active materials in the negative and positive electrolyte solutions. When Reaction 1 occurs, however, a fraction of the current is directed to hydrogen evolution, not charging of the active material in the negative electrolyte solution. As a result, at the end of the charging cycle, the state of charge of the negative electrolyte solution is lower than that of the positive electrolyte solution, assuming no parasitic reactions occurred in the positive electrolyte solution. Upon generation of hydrogen and hydroxide ions in the negative half-cell of the flow battery, the pH of the negative electrolyte solution can increase, as discussed above. A corresponding oxidation of the active material in the positive half-cell occurs in conjunction with the negative parasitic reaction, along with cation migration to the negative electrolyte solution to offset the charge of the generated hydroxide ions, thereby leading to a state of charge imbalance. Reduction of the active material in the negative electrolyte solution also occurs concurrently with this process. FIG. 1 shows a diagram demonstrating the reactions associated with parasitic generation of hydrogen in the negative half-cell of an illustrative flow battery. As shown in FIG. 1, free cations (e.g., K+ or other alkali metal ions) from the oxidized iron hexacyanide complex in the positive half-cell of flow battery 1 migrate through separator 20 to counterbalance the negative charge associated with the hydroxide ions in the negative electrolyte solution and/or the increased charge associated with the reduced active material. Although FIG. 1 has shown an iron hexacyanide complex as a specific active material undergoing oxidation in the positive half-cell of flow battery 1, it is to be recognized that such disclosure is exemplary and non-limiting in order that the sequence of reactions can be better understood. In the interest of clarity, concurrent reduction of the active material in the negative electrolyte solution is not shown in FIG. 1. As discussed further below, the electrochemical balancing cells of the present disclosure can remedy the resulting pH change in the negative electrolyte solution while simultaneously addressing the resulting state of charge imbalance between the positive and negative electrolyte solutions.

A particularly attractive class of flow batteries makes use of coordination complexes as an active material in one or both electrolyte solutions. As used herein, the terms "coordination complex," "coordination compound," and "metal-ligand compound" will refer to any compound having a metal bound to one or more ligands through a covalent bond. While coordination complexes can improve the operating performance of flow batteries, they can be especially susceptible toward pH changes, as discussed hereinafter.

Although parasitic reactions can be undesirable for all types of flow batteries, the pH changes accompanying hydrogen evolution can be especially problematic for electrolyte solutions containing coordination complexes. Oftentimes, such substances can be stable only within a narrow pH window, and generation of even small amounts of protons or hydroxide ions within the electrolyte solution can result in wild pH swings that can comprise the operability of a flow battery. Further, pH regulation of electrolyte solutions by adding an external acid or base can be problematic to manage due to changes in ionic strength and/or decreased concentration of the active material. While buffers can be utilized in some instances to forestall pH changes, they cannot be used in all cases, and it may not be possible to provide sufficient buffering capacity to maintain an electrolyte solution in a usable condition over its anticipated working lifetime.

Conventional approaches for rectifying a state of charge imbalance between two electrolyte solutions involve reducing either of 1) the active material in a positive electrolyte solution or 2) the active material in a negative electrolyte solution within a two-chamber electrochemical balancing cell, thereby bringing the two electrolyte solutions back into balance with one another. Oxidation of water is performed under both approaches in the chamber opposite that where modification of the active material takes place. Both of these approaches have significant limitations, as discussed hereinafter.

In one rebalancing approach, water is oxidized to oxygen and protons in one chamber of a two-chamber electrochemical balancing cell under the influence of an iridium oxide catalyst associated with a membrane electrode assembly. An active material in the positive electrolyte solution, such as an iron hexacyanide complex, undergoes reduction in a corresponding half-reaction within the other chamber of the two-chamber electrochemical balancing cell. Protons generated from the oxidation of water can migrate across the membrane electrode assembly to offset the increased negative charge in the reduced active material in the positive electrolyte solution. Although this rebalancing approach can occur at low voltages of around 1 V and can bring the positive electrolyte solution back into charge balance with the negative electrolyte solution, it does nothing to address the pH change that initially occurred in the negative electrolyte solution. A further disadvantage of this approach is that additional hydrogen can be evolved within the electrochemical balancing cell itself, depending on the degree of electrode polarization.

In another rebalancing approach, water can again be oxidized to oxygen and protons in one chamber of a two-chamber electrochemical balancing cell under the influence of an iridium oxide catalyst associated with a membrane electrode assembly. In this case, an active material in the negative electrolyte solution, such as a transition metal complex (e.g., a transition metal catecholate complex), undergoes reduction in a corresponding half-reaction within the other chamber of the two-chamber electrochemical balancing cell. Protons generated from the oxidation of water can again migrate across the membrane electrode assembly to offset the increased negative charge in the reduced active material. Although both pH and the state of charge of the negative electrolyte solution can be addressed in this rebalancing approach, it too can be problematic due to the high operating voltages (~3 V) needed to successfully reduce the active material in the negative electrolyte solution. Such high operating voltages can result in excessive operating costs and other difficulties. Further, high operating voltages of this magnitude can result in hydrogen generation within the electrochemical balancing cell itself.

Given the general issues associated with pH and state of charge modification within electrolyte solutions, the present inventor discovered alternative rebalancing approaches that can achieve simultaneous modification of pH and state of charge in both electrolyte solutions of a flow battery simultaneously. Namely, the inventor discovered that by utilizing a three-chamber electrochemical balancing cell and processing both electrolyte solutions through the electrochemical balancing cell at the same time, concurrent adjustment of pH and state of charge can be realized. Advantageously, such an approach can affect both a pH decrease in the negative electrolyte solution and a reduction of the active material in the positive electrolyte solution, thereby directly offsetting the two primary detrimental effects resulting from parasitic generation of hydrogen. Advantageously, such modification strategies can take place without addition of an extraneous acid or base to the electrochemical balancing cell. Further, low operating voltages can be utilized, thereby avoiding issues associated with excessive energy consumption and possible generation of additional hydrogen in the electrochemical balancing cell. Therefore, utilization of a three-chamber electrochemical balancing cell of the present disclosure can afford the advantages discussed above for two-chamber electrochemical balancing cells without the associated disadvantages of either two-chamber cell configuration. The three-chamber cell architecture and further details directed to its operation will be discussed in more detail hereinbelow.

Figure 2:
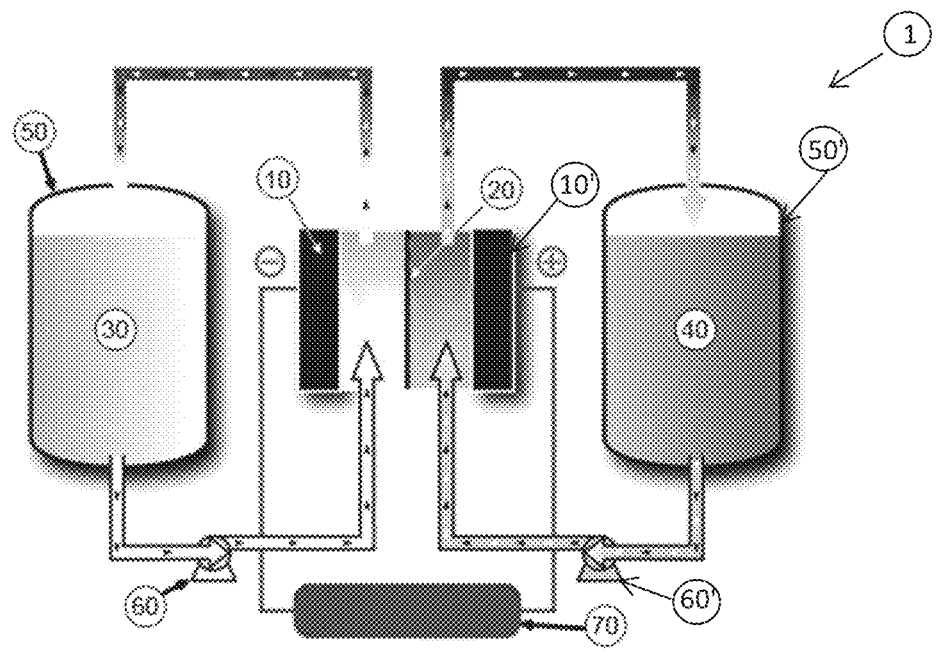
FIG. 2 shows a schematic of an illustrative flow battery containing a single electrochemical cell.

Before further discussing the balancing strategies discovered by the present inventor, illustrative flow battery configurations and their operating characteristics will first be described in greater detail hereinafter. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 2 shows a schematic of an illustrative flow battery containing a single electrochemical cell. Although FIG. 2 shows a flow battery containing a single electrochemical cell, approaches for combining multiple electrochemical cells together are known and are discussed hereinbelow.

As shown in FIG. 2, flow battery system 1 includes an electrochemical cell that features separator 20 between the two electrodes 10 and 10' of the electrochemical cell. As used herein, the terms "separator" and "membrane" will refer to an ionically conductive and electrically insulating material disposed between the positive and negative electrodes of an electrochemical cell. Electrodes 10 and 10' are formed from a suitably conductive material, such as a metal, carbon, graphite, and the like, and the materials for two can be the same or different. Although FIG. 2 has shown electrodes 10 and 10' as being spaced apart from separator 20, electrodes 10 and 10' can also be disposed in contact with separator 20 in more particular embodiments, or a porous material can intervene between the two.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps can also be used to affect transport of active materials 30 and 40 from the electrochemical cell back to tanks 50 and 50' (not shown in FIG. 2). Other methods of affecting fluid transport, such as siphons, for example, can also suitably transport first and second active materials 30 and 40 into and out of the electrochemical cell. Also shown in FIG. 2 is power source or load 70, which completes the circuit of the electrochemical cell and allows a user to collect or store electricity during its operation.

It should be understood that FIG. 2 depicts a specific, non-limiting configuration of a particular flow battery. Accordingly, flow batteries consistent with the spirit of the present disclosure can differ in various aspects relative to the configuration of FIG. 2. As one example, a flow battery system can include one or more active materials that are solids, gases, and/or gases dissolved in liquids. Active materials can be stored in a tank, in a vessel open to the atmosphere, or simply vented to the atmosphere.

The illustrative flow batteries described hereinabove can be placed in fluid communication with an electrochemical balancing cell of the present disclosure, which will now be described in greater detail. In various embodiments, electrochemical balancing cells of the present disclosure can include a first chamber containing a first electrode, a second chamber containing a second electrode, a third chamber disposed between the first chamber and the second chamber, a first cation-selective membrane forming a first interface between the first chamber and the third chamber, and a bipolar membrane, a second cation-selective membrane, or a membrane electrode assembly forming a second interface between the second chamber and a third chamber.

In some embodiments, the first electrode can be a negative electrode and the second electrode can be a positive electrode. As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. Maintaining the first electrode as a negative electrode and the second electrode as a positive electrode can allow oxidation of water or hydroxide ions to occur in concert with reduction of the active material in a positive electrolyte solution, as discussed hereinafter.

As used herein, the term "membrane electrode assembly" will refer to a layered structure containing an ion-selective membrane and a catalyst. The ion-selective membrane can be a cation-selective membrane in some embodiments or an anion-selective membrane in other embodiments. In more particular embodiments, a membrane electrode assembly suitable for forming the second interface in the electrochemical balancing cells disclosed herein can include a cation-selective membrane and an oxygen-formation catalyst. Further disclosure regarding cell configurations in which a membrane electrode assembly is present are discussed in additional detail hereinbelow.

As used herein, the term "bipolar membrane" will refer to a non-porous ion-exchange membrane having two oppositely charged ion-exchange layers overlaying and contacting one another. In more particular embodiments, the bipolar membrane can include a first ion-exchange material that is substantially permeable toward anions (i.e., an anion-exchange membrane) and a second ion-exchange material that is substantially permeable toward cations (i.e., a cation-exchange membrane). The first ion-exchange material, in turn, is substantially impermeable toward cations and the second ion-exchange material is substantially impermeable toward anions. More particularly, a bipolar membrane can include an anion-exchange membrane and a cation-exchange membrane that are disposed in a layered structure.

Figure 3:
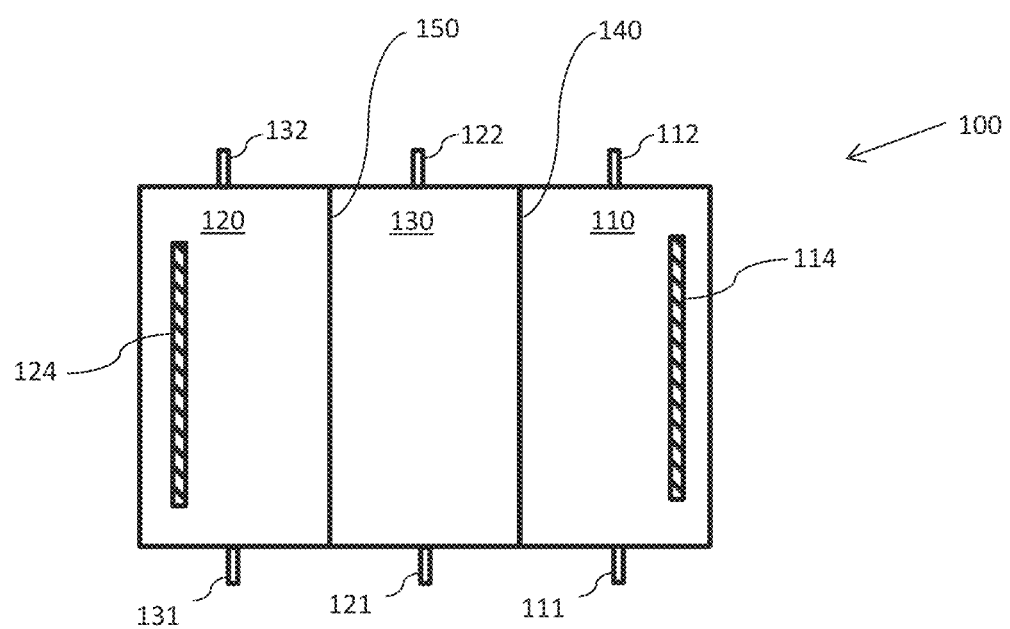
FIG. 3 shows a diagram of an illustrative electrochemical balancing cell of the present disclosure.

FIG. 3 shows a diagram of an illustrative electrochemical balancing cell of the present disclosure. As shown in FIG. 3, electrochemical balancing cell 100 contains first chamber 110, second chamber 120, and third chamber 130. Third chamber 130 is disposed between first chamber 110 and second chamber 120. First, second and third chambers 110, 120 and 130 have corresponding inlets 111, 121 and 131 and outlets 112, 122 and 132 depending therefrom, which allow first and second electrolyte solutions to be introduced to and withdrawn from an appropriate chamber of electrochemical balancing cell 100. Further disclosure to this effect follows below. First chamber 110 contains first electrode 114, and second chamber 120 contains second electrode 124. More particularly, first electrode 114 can be a negative electrode and second electrode 124 can be a positive electrode. Electrodes 114 and 124 allow a potential to be applied across electrochemical balancing cell 100 in order to affect oxidation of water or hydroxide ions to promote pH and state of charge adjustment within the first and second electrolyte solutions. The first electrolyte solution can be present in first chamber 110, and the second electrolyte solution can be in third chamber 130 according to the disclosure herein. Second chamber 120 contains water, an acidic aqueous solution, or an alkaline aqueous solution according to the disclosure herein. In at least some of the present embodiments, at least one of the first electrolyte solution and the second electrolyte solution within the electrochemical balancing cell is an aqueous electrolyte solution, such as that received from a flow battery.

With continued reference to FIG. 3, electrochemical balancing cell 100 includes a first cation-selective membrane at first interface 140 between first chamber 110 and third chamber 130, and a membrane electrode assembly, a second cation-selective membrane, or a bipolar membrane at second interface 150 between second chamber 120 and third chamber 130. As indicated above, particular membrane electrode assemblies can include a cation-exchange membrane in their layered structure. Since active materials based upon coordination complexes often bear an overall negative charge, the use of a cation-exchange membrane at first interface 140 can allow the active material to be substantially retained in its original electrolyte solution within first chamber 110. Similarly, the inclusion of a cation-exchange membrane by itself, within a membrane electrode assembly, or within a bipolar membrane at second interface 150 can prevent crossover of an active material into second chamber 120. Illustrative coordination complexes bearing an overall negative charge are discussed hereinbelow. Particular configurations containing a membrane electrode assembly, a second cation-selective membrane, or a bipolar membrane at second interface 150 are also discussed in further detail hereinbelow.

Suitable cation-exchange membranes that can be present at first interface 140 or at second interface 150 (by itself, in a membrane electrode assembly, or in a bipolar membrane) of electrochemical balancing cell 100 are not considered to be particularly limited. Suitable cation-exchange membranes can frequently bear sulfonic acid groups due to their high degree of disassociation into sulfonate anions. Accordingly, in some embodiments, the cation-exchange membrane can include a sulfonated polymer, such as a sulfonated, perfluorinated polymer. NAFION (DuPont) is representative example of such a cation-exchange membrane. In other embodiments, the cation-exchange membrane can be a sulfonated hydrocarbon, such as a sulfonated polyetheretherketone or a sulfonated polysulfone.

Suitable anion-exchange membranes for inclusion in a bipolar membrane at second interface 140 can include those bearing, for example, quaternary ammonium functional groups or phosphonium groups.

Because bipolar membranes include both a cation-exchange membrane and an anion-exchange membrane, they can exclude the passage of positively charged materials and negatively charged materials in both directions. Thus, a bipolar membrane can substantially exclude crossover of active materials within electrochemical balancing cell 100, provided that the active material retains an overall positive or negative charge in both its oxidized and reduced forms. The cation-exchange membrane and the anion-exchange membrane can include those discussed above in any combination. When second electrode 124 is a positive electrode, for example, the anion-exchange membrane can face second chamber 120 and the cation-exchange membrane can face third chamber 130. While they can exclude active material crossover, a bipolar membrane can, however, allow outward migration of a negatively charged substance and a positively charged substance to occur from an interface between the cation-exchange membrane and the anion-exchange membrane, as discussed further herein.

In some configurations, electrochemical balancing cells of the present disclosure can include a membrane electrode assembly that forms the second interface between the second chamber and the third chamber. In more specific embodiments, the membrane electrode assembly can include a cation-selective membrane and an oxygen-formation catalyst. As used herein, the term "oxygen-formation catalyst" will refer to a catalyst that is capable of converting water or hydroxide ions into oxygen under an applied potential. Some oxygen-formation catalysts can function under neutral or acidic conditions and affect conversion of water into oxygen and protons. Oxygen-formation catalysts included within a membrane electrode assembly in the embodiments of the present disclosure can include those that function suitably under neutral or acidic conditions. Other oxygen-formation catalysts can function under alkaline conditions and affect conversion of hydroxide ions into oxygen and water, as discussed hereinbelow.

As indicated above, oxygen-formation catalysts suitable for inclusion in a membrane electrode assembly can include those which function effectively under neutral or acidic conditions. In more particular embodiments, an iridium oxide catalyst can be a suitable oxygen-generation catalyst for inclusion in the membrane electrode assembly within the electrochemical balancing cells of the present disclosure. Iridium-ruthenium oxide catalysts or other noble metal catalysts can also be used suitably in this regard.

In some alternative configurations, electrochemical balancing cells of the present disclosure can include a second cation-selective membrane at the second interface between the second chamber and the third chamber. In such configurations, an oxygen-generation catalyst can be present in the second chamber, instead of being associated with a membrane electrode assembly. Electrochemical balancing cells utilizing a second cation-exchange membrane at the second interface can be used in similar situations as those described above in which a membrane electrode assembly is present.

In some configurations, electrochemical balancing cells of the present disclosure can include a bipolar membrane forming the second interface between the second chamber and the third chamber. When second electrode 124 is a positive electrode, the layer containing the anion-exchange membrane can face second chamber 120 and the layer containing the cation-exchange membrane can face third chamber 130. Under an applied potential, water can disassociation at the interface of the bipolar membrane. In the foregoing bipolar membrane configuration, anions (i.e., hydroxide ions) can migrate to the second chamber and cations (i.e., protons) can migrate to the third chamber.

In configurations in which a bipolar membrane forms the second interface in the electrochemical balancing cell, the electrochemical balancing cell can most suitably function under alkaline conditions in the second chamber. An oxygen-generation catalyst can likewise be present in configurations in which a bipolar membrane is present in the electrochemical balancing cell, but a different catalyst can be used in light of the alkaline pH conditions present in the second chamber. Further, in contrast to electrochemical balancing cell configurations having a membrane electrode assembly at the second interface, an oxygen generation catalyst can be disposed in the second chamber when a bipolar membrane is present. Suitable oxygen-generation catalysts for oxidizing hydroxide ions to oxygen under alkaline conditions include, for example, nickel or nickel-based catalysts. In some embodiments, the nickel or nickel-based catalyst can be disposed on a metal mesh, such as a titanium mesh, which is present in the second chamber. These types of oxygen-generation catalysts can be advantageous for their lower costs compared to iridium-based oxygen-generation catalysts.

The electrochemical balancing cells described hereinabove can be placed in fluid communication with a flow battery, thereby providing a flow battery system. More specifically, such flow battery systems can include a first half-cell containing a first electrolyte solution, and a second half-cell containing a second electrolyte solution, where both the first half-cell and the second half-cell are in fluid communication with the electrochemical balancing cell. The electrochemical balancing cell can include any of the various cell configurations described hereinabove.

In more specific embodiments, the first half-cell can be in fluid communication with the first chamber of the electrochemical balancing cell, and the second half-cell can be in fluid communication with the third chamber of the electrochemical balancing cell. In still more particular embodiments, the first half-cell can be a positive half-cell and the second half-cell can be a negative half-cell. Equivalently, the first electrolyte solution can be a positive electrolyte solution such that the positive electrolyte solution is in fluid communication with the first chamber, and the second electrolyte solution can be a negative electrolyte solution such that the negative electrolyte solution is in fluid communication with the third chamber. This particular configuration can be particularly advantageous for addressing the pH and state of charge changes resulting from parasitic hydrogen generation, as discussed above. In various embodiments, the flow battery can be configured to circulate the first and second electrolyte solutions between the flow battery and the appropriate chambers of the electrochemical balancing cell.

Figure 4:
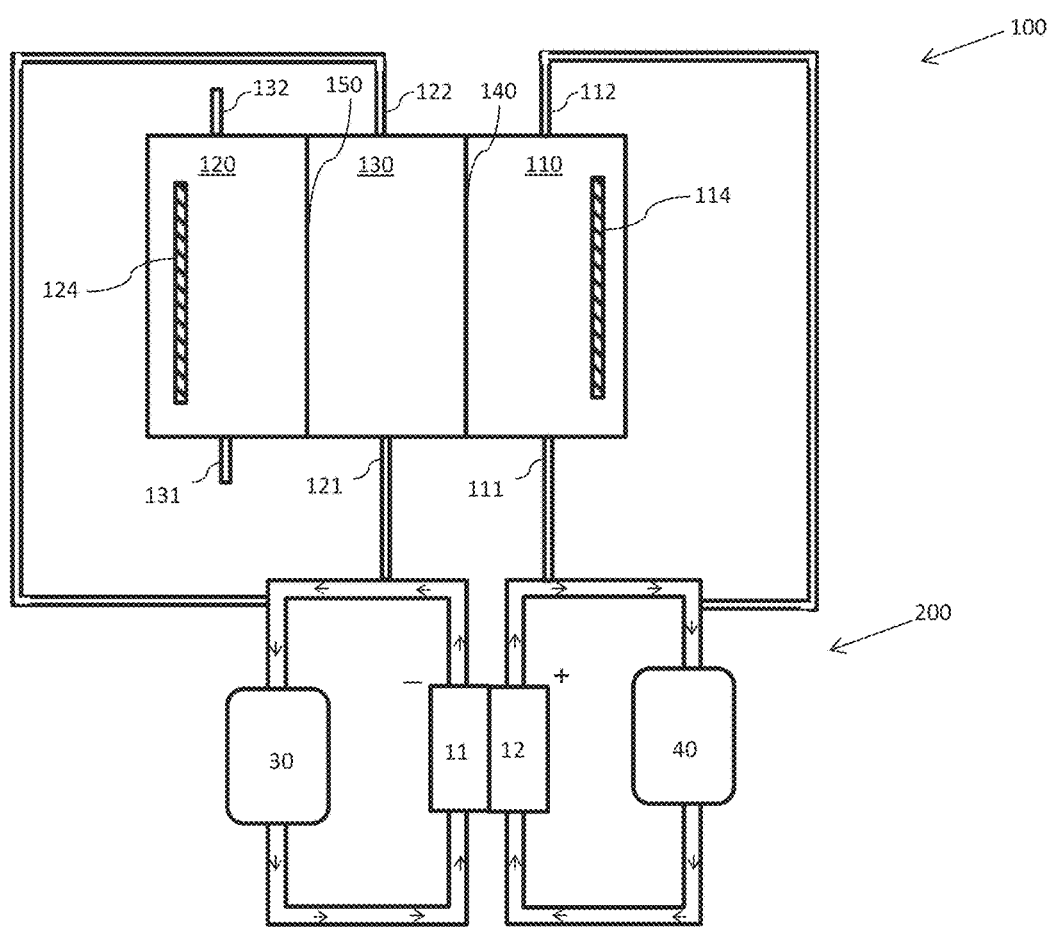
FIG. 4 shows a diagram of an illustrative flow battery system in which both half-cells of an exemplary flow battery are fluidly connected to the electrochemical balancing cell of FIG. 3.

FIG. 4 shows a diagram of an illustrative flow battery system in which both half-cells of an exemplary flow battery are fluidly connected to the electrochemical balancing cell of FIG. 3. Flow battery 200 of FIG. 4 is substantially similar in structure to that shown in FIG. 2, although certain details have been omitted and/or simplified in FIG. 4 in the interest of clarity. Although FIG. 4 has shown electrochemical balancing cell 100 as being connected to outlet lines leaving negative half-cell 11 and positive half-cell 12 of flow battery 200, it is to be recognized that such placement is illustrative in nature. For example, electrochemical balancing cell 100 can alternately be connected at tanks 30 or 40, and/or at inlet lines entering negative half-cell 11 and positive half-cell 12.

As shown in FIG. 4, negative half-cell 11 of flow battery 200 is placed in fluid communication with third chamber 130 of electrochemical balancing cell 100, and positive half-cell 12 of flow battery 200 is placed in fluid communication with first chamber 110 of electrochemical balancing cell 100. Second chamber 120 of electrochemical balancing cell can contain water, an acidic aqueous solution, or a basic aqueous solution, any of which can be circulated therethrough (not shown in FIG. 4) while the first and second electrolyte solutions are being circulated through first chamber 110 and third chamber 130, respectively. Considerations for choosing a particular aqueous medium for circulation through second chamber 120 are addressed in further detail hereinbelow. In either configuration, operation of electrochemical balancing cell 100 by applying a potential across it can allow a pH decrease to be affected in the second electrolyte solution in third chamber 130 while simultaneously affecting reduction of the active material in the first electrolyte solution within first chamber 110. As indicated above, by introducing the positive electrolyte solution of a flow battery into first chamber 110 and the negative electrolyte solution of a flow battery into third chamber 130, the configuration shown in FIG. 4 can mitigate the pH and state of charge changes brought about by parasitic generation of hydrogen.

As indicated above, an oxygen-generation catalyst can be either associated with a membrane electrode assembly at the second interface between the second chamber and the third chamber, or the oxygen-generation catalyst can be present in the second chamber itself. The nature of the oxygen-generation catalyst and its location can be dictated by the nature of the aqueous medium contained in the second chamber of the electrochemical balancing cell. The choice of a particular aqueous medium and a corresponding particular oxygen-generation catalyst can be dictated by chemical compatibility and cost concerns. For example, when a neutral or acidic aqueous solution is present in the second chamber, more expensive iridium-based catalysts can be more suitable. In contrast, when an alkaline aqueous solution is present in the second chamber, less expensive nickel-based catalysts can be more suitable. Reaction rates and potential catalyst selectivity issues may also need to be factored into one's choice of a suitable oxygen-generation catalyst for a particular situation.

In some embodiments, at least one of the first electrolyte solution and the second electrolyte solution can constitute an aqueous electrolyte solution. In more particular embodiments, both the first electrolyte solution and the second electrolyte solution can constitute an aqueous electrolyte solution. Further description of suitable aqueous solutions follows hereinbelow.

In some or other more specific embodiments, at least one of the first electrolyte solution and the second electrolyte solution can contain a coordination complex as an active material. In some embodiments, both the first electrolyte solution and the second electrolyte solution can contain a coordination complex as an active material. Additional disclosure on illustrative coordination complexes follows hereinafter.

Due to their variable oxidation states, transition metals can be highly desirable for use as the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In more specific embodiments, the transition metal can be Ti. Other suitable transition and main group metals that can be present in the coordination compounds of the present disclosure include, for example, Ca, Ce, Co, Cu, Mg, Mn, Mo, Ni, Pd, Pt, Ru, Sr, Sn, V, Zn, Zr, and any combination thereof. In various embodiments, the coordination compounds can include a transition metal in a non-zero oxidation state when the transition metal is in both its oxidized and reduced forms. Cr, Fe, Mn, Ti and V can be particularly desirable in this regard.

In some embodiments, at least one of the active materials within a flow battery can include a coordination complex bearing at least one catecholate ligand or substituted catecholate ligand. Sulfonated catecholate ligands can be particularly desirable substituted catecholate ligands due to their ability to promote solubility of coordination complexes in which they are present. In some or other embodiments, at least one of the active materials within a flow battery can include an iron hexacyanide complex. Iron hexacyanide complexes can be particularly desirable for use as a positive active material in combination with a transition metal coordination complex bearing a catecholate ligand or substituted catecholate ligand as a negative active material due to the high open circuit voltages that can be obtained.

In more specific embodiments, the coordination complex can have a formula of

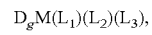

wherein M is a transition metal; D is ammonium, tetraalkylammonium ($C_1$-$C_4$ alkyl), or an alkali metal ion (e.g., $Li^+$, $Na^+$ or $K^+$); g ranges between 0 and 6; and $L_1$, $L_2$ and $L_3$ are ligands. In more specific embodiments, at least one of $L_1$, $L_2$ and $L_3$ can be a catecholate ligand or a substituted catecholate ligand. In other embodiments, each of $L_1$, $L_2$ and $L_3$ can be a catecholate ligand or substituted catecholate.

Other ligands that can be present in coordination complexes within a flow battery, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex within a flow battery include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

As indicated above, at least one of the first electrolyte solution and the second electrolyte solution can constitute an aqueous electrolyte solution in which an active material is dissolved. As used herein, the term "aqueous" will refer to the condition of water being the predominant component of a mixture or solution. As used herein, the term "aqueous electrolyte solution" will refer to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in aqueous electrolyte solutions include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, including those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second aqueous electrolyte solutions. The chambers provide separate reservoirs within the flow battery, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second aqueous electrolyte solutions, (2) electrically insulating to reduce or prevent short circuits between the positive and negative electrodes, and (3) facilitating ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 2. In a charging cycle, electrical power can be applied to the cell such that the active material contained in the second electrolyte solution undergoes a one or more electron oxidation and the active material in the first electrolyte solution undergoes a one or more electron reduction, or vice versa. Similarly, in a discharge cycle the second active material is reduced and the first active material is oxidized to generate electrical power, or vice versa.

The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF$—$O$—$CF=CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The crossover rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporated within the present disclosure can have one or more of the following operating characteristics: (a) where, during the operation of the flow battery, the first or second active materials constitute less than about 3% of the molar flux of ions passing through the ionomer membrane; (b) where the round trip current efficiency is greater than about 70%, greater than about 80%, or greater than about 90%; (c) where the round trip current efficiency is greater than about 90%, (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than are available from a single electrochemical cell. In such cases, several battery cells can be connected in series such that the voltage of each cell is additive. This forms a bipolar stack, also referred to as an electrochemical stack. A bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Having now described electrochemical balancing cells and flow batteries of the present disclosure, methods for simultaneously adjusting pH of one electrolyte solution while adjusting state of charge of another electrolyte solution using the electrochemical balancing cells will now be presented in further detail. More specifically, by establishing appropriate fluid communication between the electrochemical balancing cell and the two half-cells of a flow battery, the pH of the flow battery's negative electrolyte solution can be decreased, and the state of charge within the flow battery's positive electrolyte solution can be decreased.

In some embodiments, water or an acidic aqueous solution can be present in the second chamber of the electrochemical balancing cell. The water or acidic aqueous solution can be recirculated through the second chamber, or provided from a continuous source that is not recirculated. Accordingly, in such embodiments, methods of the present disclosure can include: providing an electrochemical balancing cell including a first chamber containing a first electrode, a second chamber containing a second electrode, a third chamber disposed between the first chamber and the third chamber, a first cation-selective membrane forming a first interface between the second chamber and the third chamber, and a membrane electrode assembly or second cation-selective membrane forming a second interface between the second chamber and the third chamber; introducing a first electrolyte solution containing a first active material into the first chamber; introducing a second electrolyte solution containing a second active material into the third chamber; introducing water or an acidic aqueous solution into the second chamber; applying a potential across the electrochemical balancing cell so as to induce a current therein, such that the second electrode is a positive electrode and the first electrode is a negative electrode; and converting water into oxygen and protons in the second chamber and reducing the first active material in the first chamber under the potential. Under the applied potential, the protons migrate into the second electrolyte solution in the third chamber. The membrane electrode assembly includes a cation-selective membrane and an oxygen-formation catalyst. Alternately, an oxygen formation catalyst is disposed in the second chamber when a second cation-selective membrane forms the second interface. Such methods are further illustrated in more detail in FIG. 5, which is discussed in greater detail hereinbelow.

In other embodiments, an alkaline aqueous solution can be present in the second chamber of the electrochemical balancing cell. The alkaline aqueous solution can be recirculated through the second chamber, or provided from a continuous source that is not recirculated. Accordingly, in such embodiments, methods of the present disclosure can include: providing an electrochemical balancing cell including a first chamber containing a first electrode, a second chamber containing a second electrode, a third chamber disposed between the first chamber and the third chamber, a cation-selective membrane forming a first interface between the second chamber and the third chamber, and a bipolar membrane forming a second interface between the second chamber and the third chamber; introducing a first electrolyte solution containing a first active material into the first chamber; introducing a second electrolyte solution containing a second active material into the third chamber; introducing an alkaline aqueous solution into the second chamber; applying a potential across the electrochemical balancing cell so as to induce a current therein, such that the second electrode is a positive electrode and the first electrode is a negative electrode; and converting hydroxide ions into oxygen and water in the second chamber and reducing the first active material in the first chamber under the potential, while disassociating water into protons and hydroxide ions within the bipolar membrane. Under the applied potential, the protons migrate into the second electrolyte solution in the third chamber, and the hydroxide ions migrate into the second chamber. Such methods are further illustrated in more detail in FIG. 6, which is discussed in greater detail hereinbelow.

In either configuration for the electrochemical rebalancing cell, the first electrolyte solution and the second electrolyte solution can be adjusted independently of their circulation through a flow battery. In more particular embodiments, however, the methods for adjusting the first and second electrolyte solutions can include placing the electrochemical balancing cell in fluid communication with a first half-cell and a second half-cell of a flow battery, and transferring the first electrolyte solution and the second electrolyte solution between the electrochemical balancing cell and the flow battery. More particularly, the first half-cell can be a positive half-cell in fluid communication with the first chamber of the electrochemical balancing cell, and the second half-cell can be a negative electrolyte solution in fluid communication with the third chamber of the electrochemical balancing cell. Transferring the first and second electrolyte solutions to and from the flow battery can take place continuously or discontinuously. Continuous transfer can involve circulating a portion of the first and second electrolyte solutions through the electrochemical balancing cell while the remaining portions of the first and second electrolyte solutions are available to circulate through the flow battery. Upon circulating the first and second electrolyte solutions from the electrochemical balancing cell, the electrolyte solutions, which are now pH- and charged balanced, can again be circulated to the flow battery.

Figure 5:
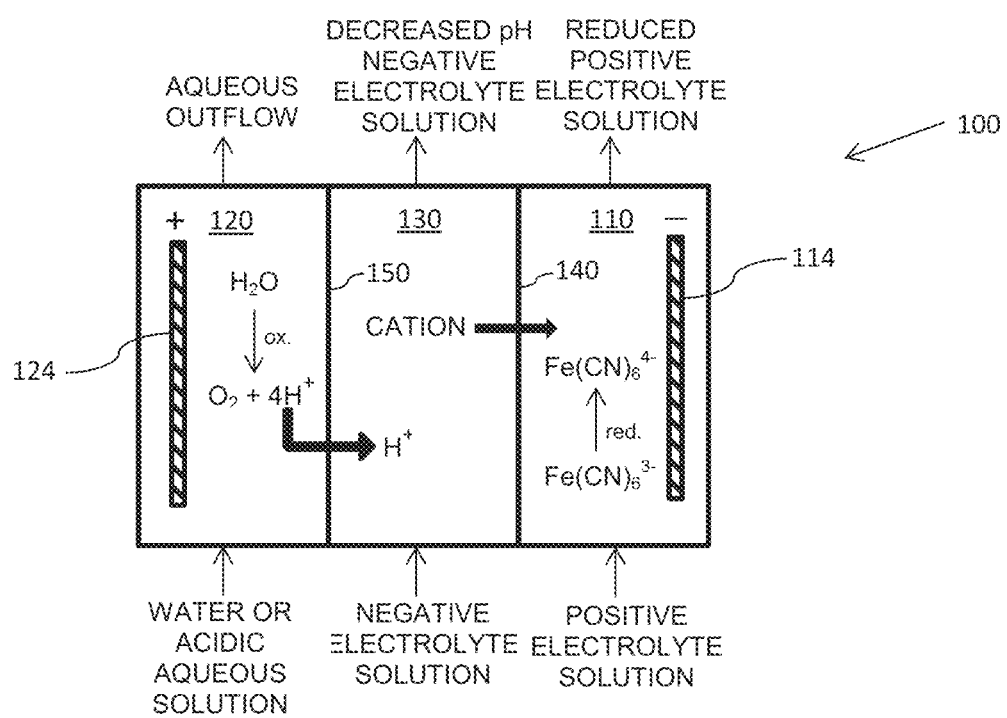
FIG. 5 shows a diagram of the electrochemical balancing cell of FIG. 3 upon introduction of a positive electrolyte solution to the first chamber of the cell, a negative electrolyte solution to the third chamber of the cell, and water or an acidic aqueous solution to the second chamber of the cell in the presence of an applied potential.

FIG. 5 shows a diagram of the electrochemical balancing cell of FIG. 3 upon introduction of a positive electrolyte solution to the first chamber of the cell, a negative electrolyte solution to the third chamber of the cell, and water or an acidic aqueous solution to the second chamber of the cell in the presence of an applied potential. In the interest of clarity, FIG. 5 omits the fluid communication of electrochemical balancing cell 100 to a flow battery and certain other details found in the earlier FIGURES so that the rebalancing reactions taking place in the presence of the applied potential can be better understood. As shown in FIG. 5, a negative electrolyte solution enters third chamber 130, a positive electrolyte solution enters first chamber 110, and water or an acidic aqueous solution enters second chamber 120 as a potential is applied between first and second electrodes 114 and 124. As further shown in FIG. 5, the applied potential is such that first electrode 114 in first chamber 110 is a negative electrode and second electrode 124 in second chamber 120 is a positive electrode.

In the presence of an oxygen-generation catalyst in a membrane electrode assembly at second interface 150, water can undergo oxidation to oxygen and protons. In alternative configurations, the oxygen-generation catalyst can be present in second chamber 120, and the second interface can be a second cation-selective membrane. In either case, the positive active material in first chamber 110 can concurrently undergo reduction. Protons generated in second chamber 120 can migrate across second interface 150 to affect a pH decrease in the negative electrolyte solution in third chamber 130. A cation (e.g., Na$^+$, K$^+$, or another alkali metal ion) from the negative electrolyte solution in third chamber 130 can likewise migrate across first interface 140 to balance the increased negative charge in the positive electrolyte solution in first chamber 110. The current densities in the electrochemical balancing cell 100 can be maintained such that the pH decrease in the negative electrolyte solution in third chamber 130 is not excessive.

Figure 6:
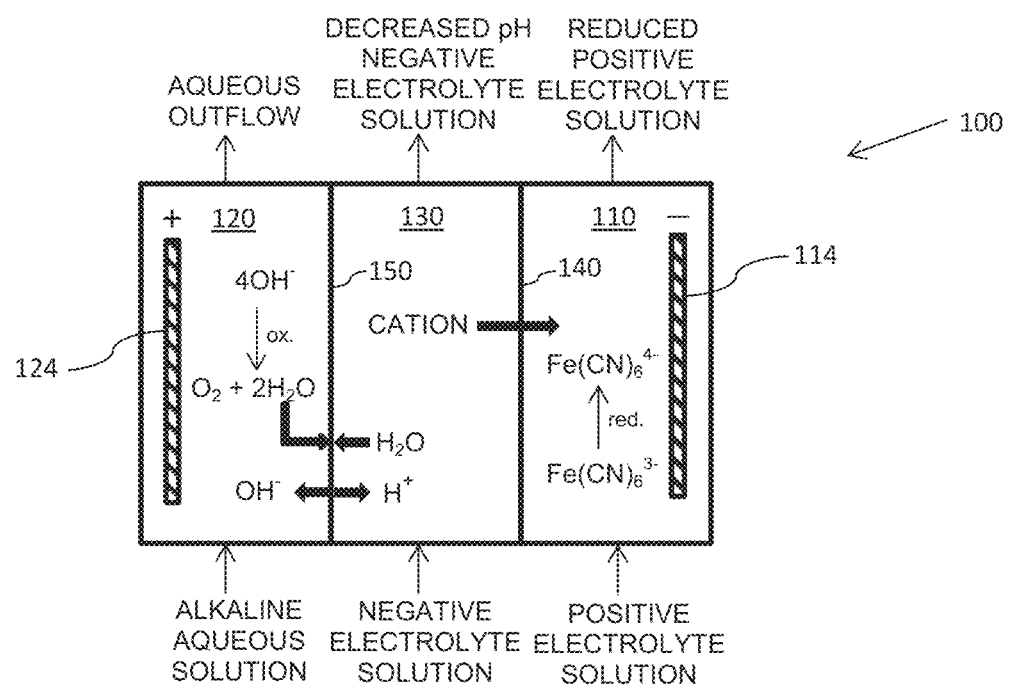
FIG. 6 shows a diagram of the electrochemical balancing cell of FIG. 3 upon introduction of a positive electrolyte solution to the first chamber of the cell, a negative electrolyte solution to the third chamber of the cell, and an alkaline aqueous solution to the second chamber of the cell in the presence of an applied potential.

FIG. 6 shows a diagram of the electrochemical balancing cell of FIG. 3 upon introduction of a positive electrolyte solution to the first chamber of the cell, a negative electrolyte solution to the third chamber of the cell, and an alkaline aqueous solution to the second chamber of the cell in the presence of an applied potential. In the interest of clarity, FIG. 6 likewise omits the fluid communication of electrochemical balancing cell 100 to a flow battery and certain other details found in the earlier FIGURES so that the rebalancing reactions taking place in the presence of the applied potential can be better understood. As shown in FIG. 6, a negative electrolyte solution enters third chamber 130, a positive electrolyte solution enters first chamber 110, and an alkaline aqueous solution enters second chamber 120 as a potential is applied between first and second electrodes 114 and 124. As further shown in FIG. 6, the applied potential is such that first electrode 114 in first chamber 110 is a negative electrode and second electrode 124 in second chamber 120 is a positive electrode.

In the presence of an oxygen-generation catalyst in second chamber 120, hydroxide ions can undergo oxidation to oxygen and water. The positive active material in first chamber 110 can concurrently undergo reduction. Water from the alkaline aqueous solution and/or water from the negative electrolyte solution in third chamber 130 can enter the bipolar membrane at second interface 150. In the presence of the applied potential, the water can undergo disassociation within the bipolar membrane to form protons (i.e., hydronium ions) and hydroxide ions. The bipolar membrane can be disposed such that the protons migrate into third chamber 130 to affect a pH decrease in the negative electrolyte solution. A cation (e.g., Na$^+$, K$^+$, or another alkali metal ion) from the negative electrolyte solution in third chamber 130 can likewise migrate across first interface 140 to balance the increased negative charge in the positive electrolyte solution in first chamber 110.

In various embodiments, the potential applied to the electrochemical balancing cell can range between about 0.1 V and about 2 V. Such voltages can be applicable for ion-selective membranes and bipolar membranes having thicknesses under about 4 mm and for electrolyte solutions having reasonable conductivity values, such as above about 10 mS/cm. In more particular embodiments, the potential applied to the electrochemical balancing cell can be about 1 V or under. By reducing the active material in the positive electrolyte solution within first chamber 110, the potential at first electrode 114 is insufficiently negative to produce hydrogen via reduction. Particularly, by keeping the applied voltage under about 2V, electrolytic generation of hydrogen in the electrochemical balancing cell can be substantially precluded. The lack of hydrogen evolution can provide a high current efficiency to the rebalancing process and improve durability of the flow battery system.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" will refer to the total current passed in an electrochemical cell divided by the geometric area of the electrodes of the cell and is commonly reported in units of mA/cm$^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

EXAMPLES

Example 1

A three-chamber electrochemical balancing cell described above was utilized in this example with a cation-exchange membrane disposed between the first and third chambers and a membrane electrode assembly disposed between the second and third chambers. The membrane electrode assembly contained a cation-exchange membrane and iridium oxide catalyst. The third chamber had a thickness of 9 mm and was filled with a polyester felt. A negative aqueous electrolyte solution containing various concentrations of sodium chloride as a supporting extraneous electrolyte was circulated through the third chamber, and a positive aqueous electrolyte solution was circulated through the first chamber. The active material in the negative aqueous electrolyte solution was a titanium catecholate complex, and the active material in the positive aqueous electrolyte solution was an iron hexacyanide complex. Deionized water was circulated through the second chamber while an operating potential of 0.8-0.9 V (open circuit voltage) was applied across the cell. The operating temperature was 45° C.

Figure 7:
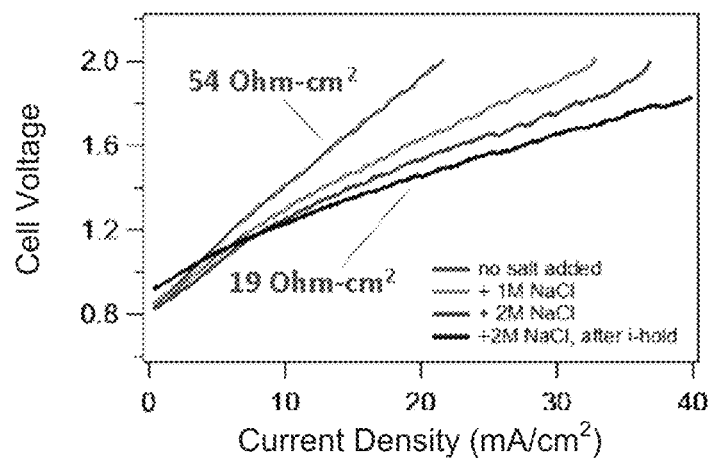
FIG. 7 shows an illustrative plot of voltage versus current density for a negative aqueous electrolyte solution treated under "acidic" rebalancing conditions at 45° C.

FIG. 7 shows an illustrative plot of voltage versus current density for a negative aqueous electrolyte solution treated under "acidic" (see FIG. 5 for generic operating conditions) rebalancing conditions at 45° C. The high cell resistance is believed to be due to the relatively thick third chamber. Further data comparing "acidic" rebalancing conditions to "alkaline" (see FIG. 6 for generic operating conditions) rebalancing conditions is provided below (see FIGS. 9-11).

Example 2

The electrochemical balancing cell setup of Example 1 was utilized, except for the differences described hereinafter. The membrane electrode assembly of Example 1 was replaced with a bipolar membrane, and a titanium plate containing a nickel foam catalyst was disposed in the second chamber. Instead of circulating deionized water through the second chamber, a 1 M aqueous solution of 1:1 NaOH/KOH was used. Operation again took place at an applied potential of 0.8-0.9 V and at a temperature of 45° C.

Figure 8:
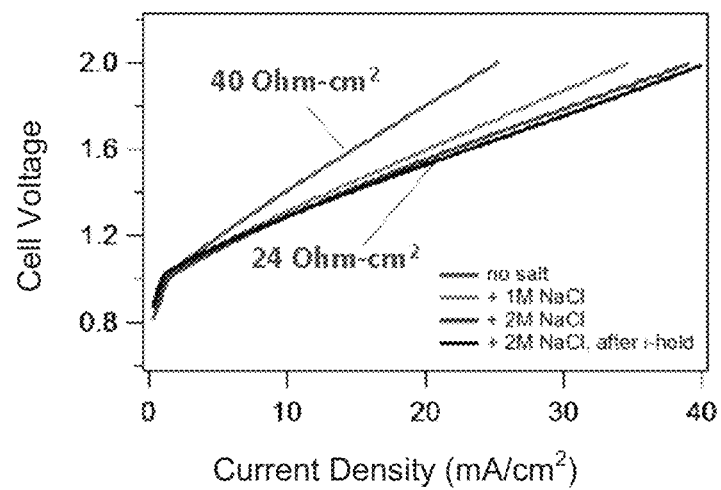
FIG. 8 shows an illustrative plot of voltage versus current density for a negative electrolyte solution treated under "alkaline" rebalancing conditions at 45° C.

FIG. 8 shows an illustrative plot of voltage versus current density for a negative aqueous electrolyte solution treated under "alkaline" rebalancing conditions at 45° C. The high cell resistance is again believed to be due to the relatively thick third chamber. Further data comparing "acidic" rebalancing conditions to "alkaline" rebalancing conditions is provided below (see FIGS. 9-11).

Figure 9:
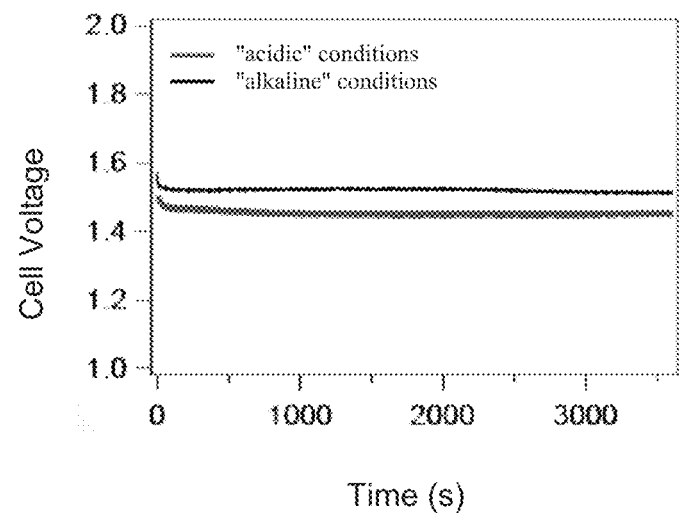
FIGS. 9-11 show comparative data of an electrochemical balancing cell operated under "acidic" and alkaline conditions.
Figure 10:
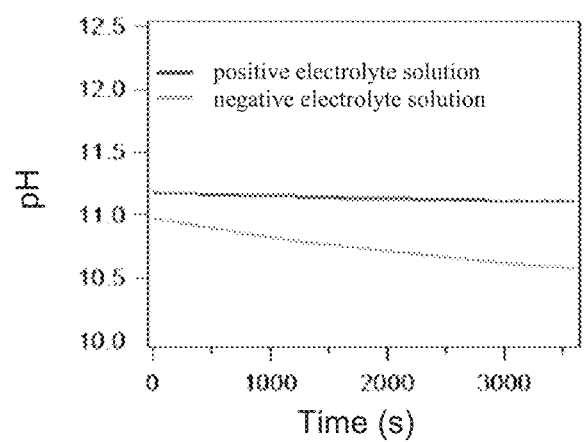
Figure 11:
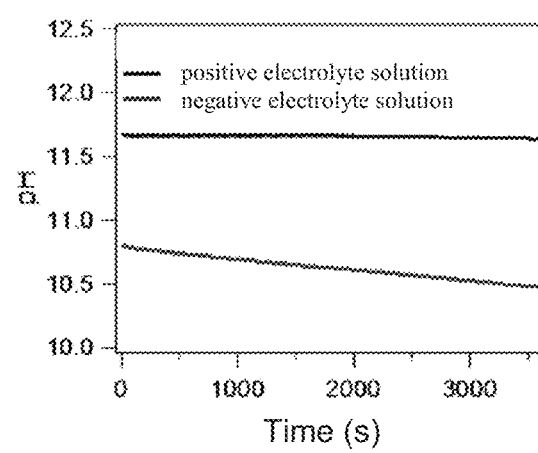

FIGS. 9-11 show comparative data of an electrochemical balancing cell operated under "acidic" and alkaline conditions. At a current density of 20 mA/cm$^2$, FIG. 9 shows that the cell voltage remained stable for at least one hour. Similarly, FIGS. 10 and 11 show that both "acidic" and "basic" rebalancing conditions brought about similar pH changes in the negative electrolyte solution. The pH of the positive electrolyte solution was largely unchanged, as expected.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery system comprising:
    a first half-cell containing a first electrolyte solution comprising a first active material; and
    a second half-cell containing a second electrolyte solution;
    wherein both the first half-cell and the second half-cell are in fluid communication with an electrochemical balancing cell comprising:
    a first chamber containing a first electrode;
    a second chamber containing a second electrode;
    a third chamber disposed between the first chamber and the second chamber;
    a first cation-selective membrane forming a first interface between the first chamber and the third chamber; and
    a bipolar membrane, a second cation-selective membrane, or a membrane electrode assembly forming a second interface between the second chamber and the third chamber;
    wherein the first half-cell is in fluid communication with the first chamber and the second half-cell is in fluid communication with the third chamber.

2. The flow battery system of claim 1, wherein the first electrolyte solution is a positive electrolyte solution and the second electrolyte solution is a negative electrolyte solution.

3. The flow battery system of claim 1, wherein a membrane electrode assembly forms the second interface wherein the membrane electrode assembly comprises a cation-selective membrane and an oxygen-formation catalyst.

4. The flow battery system of claim 3, wherein the second chamber contains water or an acidic aqueous solution.

5. The flow battery system of claim 1, wherein a bipolar membrane or a second cation selective membrane forms the second interface and the electrochemical balancing cell further comprises an oxygen-formation catalyst in the second chamber.

6. The flow battery system of claim 5, wherein the second chamber contains an alkaline aqueous solution when a bipolar membrane forms the second interface.

7. The flow battery system of claim 5, wherein the second chamber contains water or an acidic aqueous solution when a second cation-selective membrane forms the second interface.

8. The flow battery system of claim 1, wherein the first electrode is a negative electrode and the second electrode is a positive electrode.

9. The flow battery system of claim 1, wherein the first electrolyte solution and the second electrolyte solution each comprise an aqueous electrolyte solution.

10. The flow battery system of claim 1, wherein at least one of the first electrolyte solution and the second electrolyte solution comprises a coordination complex as an active material.

11. A method of electrochemically rebalancing the state of charge in the flow battery system of claim 4, the method comprising:
    (a) transferring
        (i) the first electrolyte solution between the first half-cell and the first chamber and
        (ii) the second electrolyte solution between the second half-cell and the third chamber
        of the flow battery system of claim 4;
    (b) applying a potential across the electrochemical balancing cell to induce a current therein, such that the second electrode is a positive electrode and the first electrode is a negative electrode; and
    (c) converting water into oxygen and protons in the second chamber and reducing the first active material in the first chamber under the potential;
    wherein the protons migrate into the second electrolyte solution in the third chamber.

12. The method of claim 11, wherein the first electrolyte solution and the second electrolyte solution each comprise an aqueous electrolyte solution.

13. The method of claim 11, wherein at least one of the first electrolyte solution and the second electrolyte solution comprises a coordination complex as an active material.

14. A method of electrochemically rebalancing the state of charge in the flow battery system of claim 6, the method comprising:
- (a) transferring
  - (i) the first electrolyte solution between the first half-cell and the first chamber and
  - (ii) the second electrolyte solution between the second half-cell and the third chamber of the flow battery system of claim 6;
- (b) applying a potential across the electrochemical balancing cell to induce a current therein, such that the second electrode is a positive electrode and the first electrode is a negative electrode; and
- (c) converting hydroxide ions into oxygen and water in the second chamber and reducing the first active material in the first chamber under the potential, while converting water into protons and hydroxide ions at the bipolar membrane;

wherein the protons migrate into the second electrolyte solution in the third chamber and the hydroxide ions migrate into the second chamber.

15. The method of claim 14, wherein the first electrolyte solution and the second electrolyte solution each comprise an aqueous electrolyte solution.

16. The method of claim 14, wherein at least one of the first electrolyte solution and the second electrolyte solution comprises a coordination complex as an active material.

\* \* \* \* \*